US012763470B2

(12) United States Patent
Seo et al.

(10) Patent No.: US 12,763,470 B2
(45) Date of Patent: Oct. 13, 2026

(54) ELECTRONIC DEVICE COMPRISING ANTENNA MODULE

(71) Applicant: SAMSUNG ELECTRONICS CO., LTD., Suwon-si (KR)

(72) Inventors: Jungwoo Seo, Suwon-si (KR); Jungi Jeong, Suwon-si (KR); Taeksun Kwon, Suwon-si (KR); Chanju Park, Suwon-si (KR); Dongjin Jung, Suwon-si (KR); Sanghyuk Wi, Suwon-si (KR); Seungyoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/708,975

(22) PCT Filed: Nov. 14, 2022

(86) PCT No.: PCT/KR2022/017901
§ 371 (c)(1),
(2) Date: May 9, 2024

(87) PCT Pub. No.: WO2023/085890
PCT Pub. Date: May 19, 2023

(65) Prior Publication Data

US 2025/0007166 A1 Jan. 2, 2025

(30) Foreign Application Priority Data

Nov. 12, 2021 (KR) ........................ 10-2021-0155676

(51) Int. Cl.
*H01Q 9/04* (2006.01)
*H01Q 21/06* (2006.01)

(52) U.S. Cl.
CPC ......... *H01Q 9/0407* (2013.01); *H01Q 21/065* (2013.01)

(58) Field of Classification Search
None
See application file for complete search history.

(56) References Cited

U.S. PATENT DOCUMENTS 8,330,259 B2 12/2012 Soler Castany et al.
8,842,055 B2 9/2014 Murdock et al.
(Continued)

FOREIGN PATENT DOCUMENTS

CN 104681973 A 6/2015
CN 107134637 A 9/2017
(Continued)

OTHER PUBLICATIONS

Supplementary European Search Report dated Feb. 6, 2025, in connection with European Patent Application No. 22893309.9, 10 pages.

(Continued)

*Primary Examiner* — Crystal L Hammond

(57) ABSTRACT

The present disclosure relates to a 5G or 6G communication system for supporting a higher data transmission rate than a 4G communication system such as LTE. An electronic device comprising an antenna module, according to an embodiment of the present disclosure, comprises: a communication module for communicating with an external electronic device; a first antenna module including a plurality of first antenna cells and first dummy cells surrounding the plurality of first antenna cells; and a controller for controlling the communication module and the first antenna module. Each of the plurality of first antenna cells may be
(Continued)

configured to have a first size, and each of the first dummy cells may be configured to have a second size smaller than the first size.

15 Claims, 16 Drawing Sheets

(56) References Cited

U.S. PATENT DOCUMENTS

| | | | | |
|---|---|---|---|---|
| 10,594,019 | B2 | 3/2020 | Baks et al. | |
| 10,797,394 | B2 * | 10/2020 | Dalmia | H01Q 1/38 |
| 2010/0099370 | A1 | 4/2010 | Nichols et al. | |
| 2013/0059551 | A1 | 3/2013 | Ginsburg et al. | |
| 2016/0104934 | A1 | 4/2016 | Jang et al. | |
| 2019/0267713 | A1 | 8/2019 | Jeong et al. | |
| 2020/0161744 | A1 | 5/2020 | Baks et al. | |
| 2020/0286841 | A1 | 9/2020 | Kamgaing et al. | |
| 2020/0358173 | A1 * | 11/2020 | Jong | H01Q 1/243 |
| 2021/0029821 | A1 * | 1/2021 | Hwang | H01Q 15/008 |
| 2022/0209392 | A1 | 6/2022 | Wang et al. | |

FOREIGN PATENT DOCUMENTS

| | | | |
|---|---|---|---|
| KR | 10-2016-0042740 | A | 4/2016 |
| KR | 10-2019-0090324 | A | 8/2019 |
| KR | 10-2021-0125569 | A | 10/2021 |
| WO | 2012125191 | A1 | 9/2012 |

OTHER PUBLICATIONS

International Search Report and Written Opinion of the International Searching Authority dated Feb. 23, 2023, in connection with International Application No. PCT/KR2022/017901, 9 pages.

Office Action issued Feb. 4, 2026, in connection with Korean Patent Application No. 10-2021-0155676, 14 pages.

* cited by examiner

ELECTRONIC DEVICE COMPRISING ANTENNA MODULE

CROSS-REFERENCE TO RELATED APPLICATIONS

This application is a U.S. National Phase Entry of PCT International Application No. PCT/KR2022/017901, which was filed on Nov. 14, 2022, and claims priority to Korean Patent Application No. 10-2021-0155676, which was filed in the Korean Patent Office on Nov. 12, 2021, the entire disclosure of which is incorporated herein by reference.

TECHNICAL FIELD

The disclosure relates to a technology for utilizing an antenna module including dummy cells for improving a scan range in a wireless communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DETAILED DESCRIPTION OF THE INVENTION

Technical Problem

The disclosure provides a device configured to improve a scan range without structure change of an antenna itself in a wireless communication system.

Technical Solution

An electronic device according to an embodiment of the present disclosure includes a communication module for communicating with an external electronic device, a first antenna module including multiple first antenna cells and first dummy cells surrounding the multiple first antenna cells, and a controller for controlling the communication module and the first antenna module. Each of the multiple first antenna cells may be configured to have a first size, and each of the first dummy cells may be configured to have a second size smaller than the first size.

According to an embodiment, the electronic device may further include a package including the communication module and the first antenna module.

According to an embodiment, the electronic device may further include a second antenna module including multiple second antenna cells and second dummy cells surrounding the second antenna cells and a package including the communication module, the first antenna module, and the second antenna module.

According to an embodiment, each of the multiple first antenna cells may include a feed for receiving power.

According to an embodiment, each of the first dummy cells may be configured to have a via and to have a resonance length identical to that of the multiple first antenna cells.

According to an embodiment, positions and the number of vias included in each of the first dummy cells may be determined according to a polarization direction.

According to an embodiment, it may be configured that the number of the first dummy cells is greater than that of the multiple first antenna cells and an interval between first dummy cells is smaller than that between the multiple first antenna cells.

According to an embodiment, each of the first dummy cells may be configured to have a resonance length shorter than that of the multiple first antenna cells.

According to an embodiment, each of the first dummy cells may be configured in at least one shape among circle, triangle, rectangle, or square.

According to an embodiment, each of the first dummy cells may be configured to have a multi-layer structure.

According to an embodiment, each of the first dummy cells may be configured by combination of dummy cells having different sizes.

According to an embodiment, the first dummy cells may be arranged in a scan direction.

An electronic device according to another embodiment of the disclosure may include a communication module configured to communicate with an external electronic device, a first antenna module including multiple first antenna cells and first dummy cells surrounding the multiple first antenna cells, a second antenna module located a preconfigured distance apart from the first antenna module and including multiple second antenna cells and second dummy cells surrounding the multiple second antenna cells, and a controller configured to control the communication module, the first antenna module, and the second antenna module. Each of the multiple first antenna cells may be configured to have a first size, each of the first dummy cells may be configured to have a second size smaller than the first size, each of the multiple second antenna cells may be configured to have a third size, and each of the second dummy cells may be configured to have a fourth size smaller than the third size.

According to an embodiment, the first size may be identical to the third size, and the second size may be identical to the fourth size.

Advantageous Effects

An electronic device according to an embodiment of the disclosure may provide an antenna module which may improve a scan range by minimizing performance degradation within a limited-size package structure.

An electronic device according to an embodiment of the disclosure may provide an antenna module which may improve a scan range by using an antenna array including miniaturized dummy cells.

MODE FOR CARRYING OUT THE INVENTION

Figure 1:
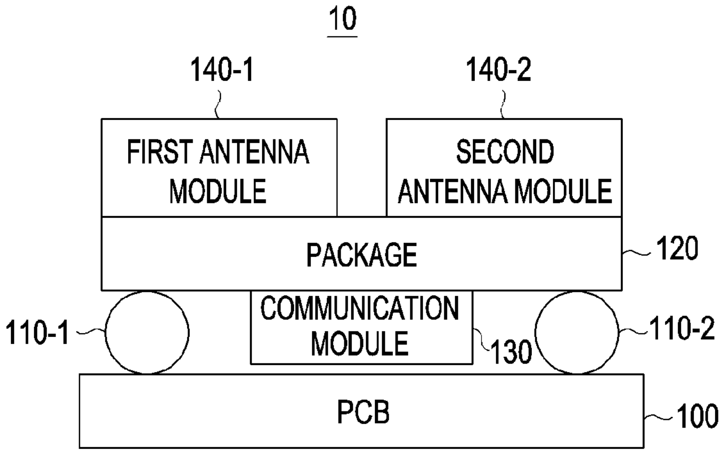
FIG. 1 is a view illustrating an example of an antenna in package (AiP) structure according to an embodiment of the disclosure.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The embodiments of the disclosure are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in the embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

FIG. 1 is a view illustrating an example of an antenna in package (AiP) structure according to an embodiment of the disclosure.

Referring to FIG. 1, an electronic device 10 realizing an antenna in package (AiP) includes a printed circuit board (PCB) 100, a first solder ball 110-1, a second solder ball 110-2, a package (or IC package) 120, a communication module 130, a first antenna module 140-1, and a second antenna module 140-2. The electronic device 10 according to various embodiments disclosed in the disclosure may include devices in various shapes. The electronic device 10 may include, for example, a portable communication device (e.g., smartphone), a computer device, a portable multimedia device, a portable medical device, a camera, a wearable device, or a home appliance device. The electronic device 10 according to an embodiment of the disclosure is not limited to the aforementioned devices. According to an embodiment, the electronic device 10 may correspond to a device that communicates based on an LTE communication technology, 5G communication technology, or 6G communication technology. According to an embodiment, the electronic device 10 may be implemented within a base station that communicates based on an LTE communication technology, 5G communication technology, or 6G communication technology.

The communication module 130 may support establishment of a direct (e.g., wired) communication channel or a wireless communication channel, and performance of communication between the established communication channel between the electronic device 10 and an external electronic device. According to an embodiment, the communication module 130 may be operated independently from the processor realized in the electronic device 10 and may include at least one communication processor configured to support direct (e.g., wired) communication or wireless communication.

The antenna module 140-1 or 140-2 may transmit/receive a signal or power to/from the outside (e.g., an external electronic device). According to an embodiment, the antenna module 140-1 or 140-2 may include an antenna including a radiator composed of a conductor or a conductive pattern disposed on the PCB 100 (or the package 120). According to an embodiment, the antenna module 140-1 or 140-2 may include multiple antennas (e.g., array antennas).

According to an embodiment, the antenna in package (AiP) structure may indicate a structure in which antenna modules 140-1 and 140-2 are realized adjacent to each other in the package 120 including the communication module 130. According to an embodiment, in the AiP structure, the communication module 130 and the antenna module 140-1 or 140-2 are integrated into one package rather than placed as separate components to allow interconnection between the communication module 130 and the antenna module 140-1 or 140-2 to be performed more efficiently.

According to an embodiment, the AiP structure may further include, in addition to the communication module 130 and the antenna module 140-1 or 140-2, at least one of a power amplifier, a low-nose amplifier, a switch, a filter, or a power management integrated circuit (PMIC) in the package 120.

The package 120 in which the communication module 130, the first antenna module 140-1, and the second antenna module 140-2 are realized may be connected to the PCB 100 by using the first solder ball 110-1 and the second solder ball 110-2. In FIG. 1, for convenience of explanation, the number of antenna modules realized in the package 120 is shown as two, but the technical idea of the disclosure is not thereto, and various numbers of antenna modules may be realized in the package 120. In FIG. 1, for convenience of explanation, the number of solder balls for connecting the package 120 and the PCB 100 is shown as two, but the technical idea of the disclosure is not limited thereto, and various numbers of solder balls for connecting the package 120 and the PCB 100 may be realized.

Figure 2:
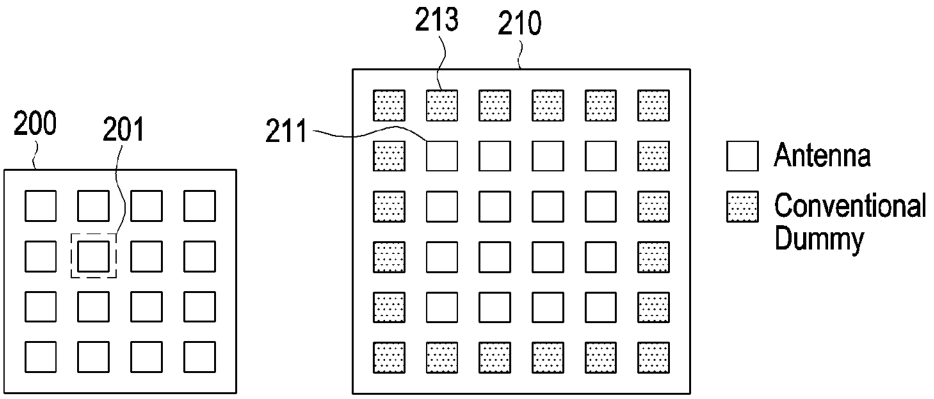
FIG. 2 is a view illustrating an example of an antenna module according to an embodiment of the disclosure.

FIG. 2 is a view illustrating an example of an antenna module according to an embodiment of the disclosure.

Referring to FIG. 2, a first antenna module 200 may include 4×4 antennas including 16 unit cells (or antenna cells or radiation antenna elements) and a second antenna module 210 may include 16 unit cells (or antenna cells or radiation antenna elements) and dummy cells surrounding 16 antenna cells. For example, the first antenna module 200 may include a unit cell 201, and the second antenna module 210 may include a unit cell 211 and a dummy cell 213 located on a periphery of the unit cell 211.

According to an embodiment, the second antenna module 210 may include dummy cells having an equal size and an equal interval on the periphery of the unit cell (or antenna cell) to improve scan range in a limited size antenna in package (AiP) tile array. According to an embodiment, the second antenna module 210 may include dummy cells so that a radiation pattern of antenna cells at outermost periphery among the antenna cells (or radiation antenna elements) is maintained to be similar to that of other antenna cells inside. According to an embodiment, the second antenna module 210 may include dummy cells and be larger in size (or area) than the first antenna module 200.

Figure 3:
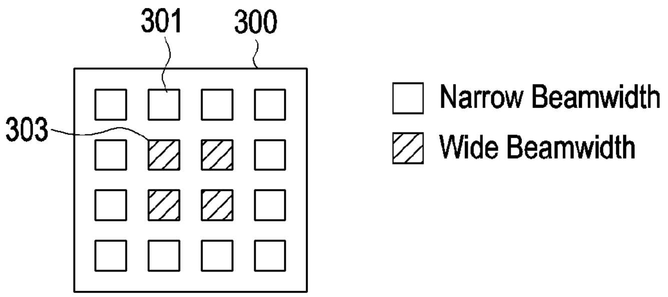
FIG. 3 is a view illustrating another example of an antenna module according to an embodiment of the disclosure.

FIG. 3 is a view illustrating another example of an antenna module according to an embodiment of the disclosure.

Referring to FIG. 3, an antenna module 300 may include four antenna cells (or first antenna elements) disposed at the center and having a wide beamwidth characteristic and 12 antenna cells (or second antenna elements) located on a periphery and having a narrow beamwidth characteristic. For example, the antenna module 300 may include a first antenna 301 having a narrow beamwidth characteristic and a second antenna cell 303 having a wide beamwidth characteristic.

According to an embodiment, the antenna cells (or the first antenna elements) located at the center of the antenna module 300 and having a wide beamwidth characteristic may be surrounded by other antenna cells and have a uniform radiation pattern, while the antenna cells (or the second antenna elements) located on the periphery of the antenna module 300 and having a narrow beamwidth characteristic may have a narrow radiation pattern due to a ground.

Figure 4:
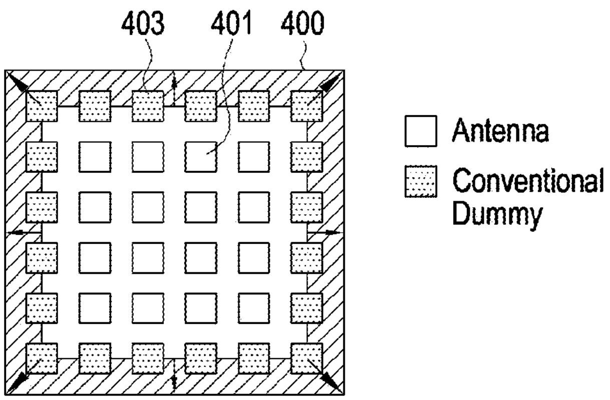
FIG. 4 is a view illustrating still another example of an antenna module according to an embodiment of the disclosure.

FIG. 4 is a view illustrating still another example of an antenna module according to an embodiment of the disclosure.

Referring to FIG. 4, the antenna module 400 may include 16 antenna cells in a 4×4 format and 20 dummy cells surrounding the 16 antenna cells. For example, the antenna module 400 may include a first antenna cell 401 and a first dummy cell 403 located on a periphery of the first antenna cell 401.

According to an embodiment, in case that the electronic device includes only one antenna module (single tile), a size of the antenna module is not an issue, but in case that the electronic device has multiple antenna modules (AiP tile array), the scan range and bandwidth reduction of the antenna cells due to dummy cells having an equal size and an equal interval may cause an issue. According to an embodiment, a case that the electronic device includes multiple antenna modules (AiP tile array) may require extension of a size of an antenna module 400 to address an issue of reduced scan range and bandwidth of antenna cells in the antenna module 400.

Figure 5:
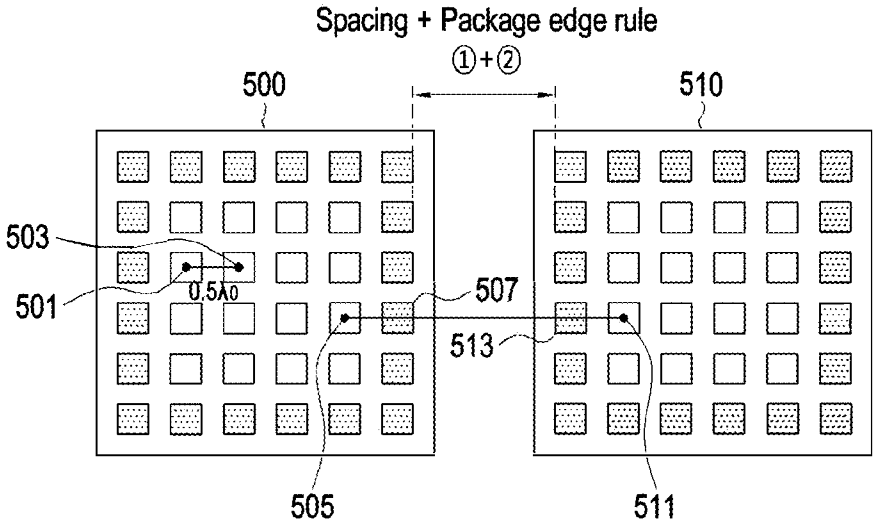
FIG. 5 is a view illustrating an antenna spacing between antenna modules according to an embodiment of the disclosure.

FIG. 5 is a view illustrating an antenna spacing between antenna modules according to an embodiment of the disclosure.

Referring to FIG. 5, a first antenna module 500 may include 16 antenna cells in a 4×4 format and 20 dummy cells surrounding the 16 antenna cells, and a second antenna module 510 may include 16 antenna cells in a 4×4 format and 20 dummy cells surrounding the 16 antenna cells. The first antenna module 500 and the second antenna module 510 may be realized in one electronic device to configure an AiP tile array.

According to an embodiment, a first antenna cell 501 and a second antenna cell 503 included in the first antenna module 500 may be disposed at intervals of $0.5\lambda_0$.

In case that the AiP tile array is realized in the electronic device, it may be ideal that the first antenna module 500 and the second antenna module 510 do not have spacing therebetween, spacing between the first antenna module 500 and the second antenna module 510 may occur due to process limitations. According to an embodiment, the spacing between the first antenna module 500 and the second antenna module 510 may be generated by an interval ① between packages and a value ② of a package edge rule. In this case, the value ② of the package edge rule may indicate an interval by which copper is designed from the package edge.

According to an embodiment, a third antenna cell 505 included in the first antenna module 500 and a first antenna cell 511 included in the second antenna module 510 may be disposed spaced apart due to a dummy cell 507 included in the first antenna module 500, a dummy cell 513 included in the second antenna module 510, and an interval between the first antenna module 500 and the second antenna module 510, and thus a bandwidth and a scan range may be reduced.

Figure 6A:
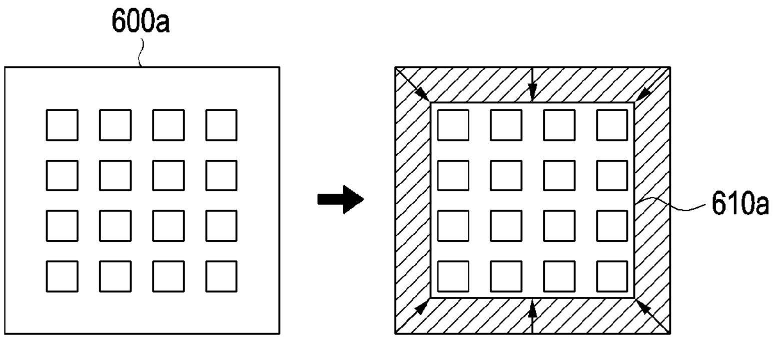
FIG. 6A is a view illustrating an example of change of a size of an antenna module according to an embodiment of the disclosure.
Figure 6B:
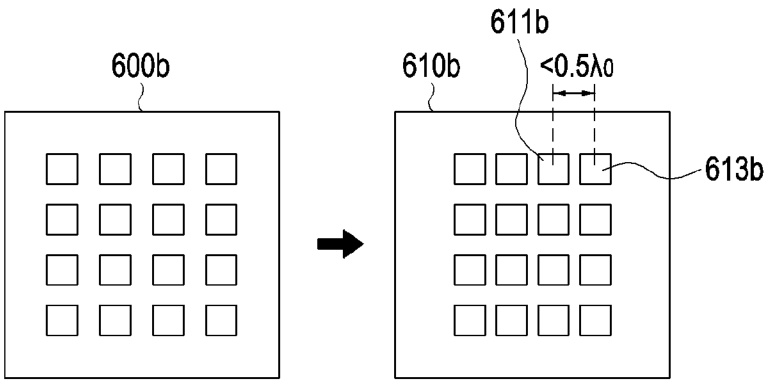
FIG. 6B is a view illustrating an example of change of interval between antenna elements included in an antenna module according to an embodiment of the disclosure.

FIG. 6A is a view illustrating an example of change of a size of an antenna module according to an embodiment of the disclosure, and FIG. 6B is a view illustrating an example of change of interval between antenna elements included in an antenna module according to an embodiment of the disclosure.

Referring to FIG. 6A, an antenna module 610*a* may be realized by reducing a size of an antenna module 600*a* to improve a scan range. However, an antenna module 600*a* having a reduced size may have a reduced communication gain compared to a conventional antenna module 600*a*. According to an embodiment, in order to maintain RFIC integration, gain, and a beamwidth, changing the size of the antenna module 600*a* module itself may be limited.

Referring to FIG. 6B, an antenna module 610*b* may be realized by reducing an interval between antenna cells (radiation antenna elements) within the antenna module 600*b* to improve a scan range. According to an embodiment, a first antenna cell 611*b* and a second antenna cell 613*b* within the antenna module 610*b* may be realized to have an interval of $0.5\lambda_0$ or less. According to an embodiment, gain and bandwidth reduction due to mutual coupling may occur when antenna cells having a close interval (less than $0.5\lambda_0$) are arranged in the antenna module 610*b* for a wide beam pattern (or improved scan range).

Figure 7:
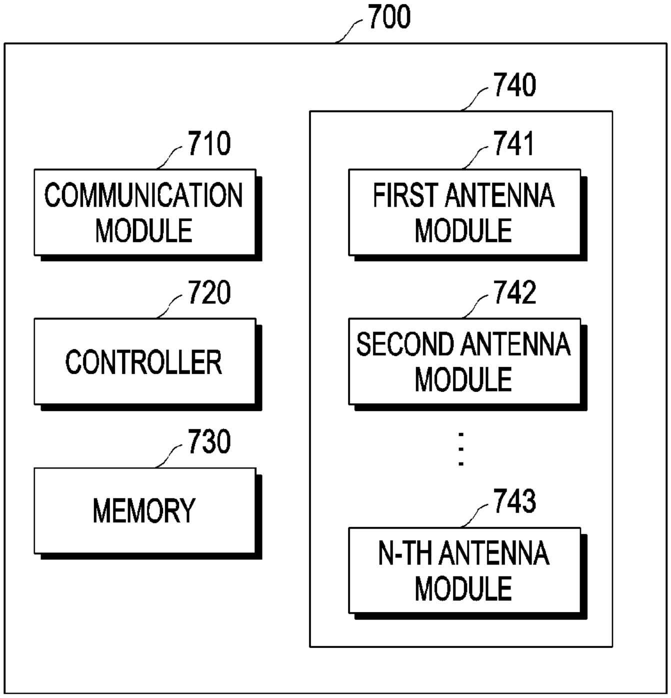
FIG. 7 is a view illustrating an electronic device including an antenna module according to an embodiment of the disclosure.

FIG. 7 is a view illustrating an electronic device including an antenna module according to an embodiment of the disclosure.

Referring to FIG. 7, the electronic device 700 may include a communication module 710, a controller 720, memory 730, and an antenna module set 740. The antenna module set 740 may include a first antenna module 741, a second antenna module 742, and an n-th antenna module (here, n is a natural number of 3 or more) 743. In FIG. 7, for convenience of explanation, the antenna module is described to include n antenna modules, but the technical idea of the disclosure is not thereto, and the antenna module 740 of the disclosure may include one or more antenna modules.

The communication module 710 may support establishment of a direct (e.g., wired) communication channel or a wireless communication channel, and performance of communication between the established communication channel between the electronic device 700 and an external electronic device. The communication module 710 may be operated independently from the controller 720 and may include at least one communication processor configured to support direct (e.g., wired) communication or wireless communication. According to an embodiment, the communication module 710 may include a wireless communication module (e.g., a cellular communication module, a near-field wireless communication module, or a global navigation satellite system (GNSS) communication module) or a wired communication module (e.g., a local area network (LAN) communication module or a power line communication module). The various types of communication modules may be integrated into one component (e.g., a single chip) or may be implemented as multiple separate components (e.g., multiple chips).

The controller 720 may execute, for example, software to control at least one other component (e.g., a hardware or software component) of the electronic device 700 connected to the controller 720 and perform various data processing or calculations. According to an embodiment, as at least a portion of data processing or calculation, the controller 720 may store a command or data received from other component (e.g., the communication module 710 or the antenna module set 740) to the memory 730, process the command or data stored in the memory 730, and store result data in the memory 730. According to an embodiment, the controller 720 may include a main processor (e.g., a central processing unit or an application processor) or a coprocessor (e.g., a graphics processing unit, a neural processing unit (NPU), an image signal processor, a sensor hub processor, or a communication processor) which may operate independently from or together with the main processor. For example, in case that the electronic device 700 includes the main processor and the coprocessor, the coprocessor may be configured to use poser lower than the main processor and to be specialized in designated functions. The coprocessor may be implemented separately from or as a portion of the main processor.

The memory 730 may store various data used by at least one component (e.g., the communication module 710, the controller 720, or the antenna module set 740) of the electronic device 700. The data may include, for example, software and input data or output data with respect to a command related thereto. The memory 730 may include transitory memory or non-transitory memory.

The antenna module set 740 may transmit/receive a signal or power to/from the outside (e.g., an external electronic device). According to an embodiment, the antenna module set 740 may include at least one antenna including a radiator including a conductor or a conductive pattern disposed on a substrate (e.g., a PCB). According to an embodiment, the first antenna module 741 may include multiple antennas (e.g., an array antenna) and multiple dummy cells, the second antenna module 742 may include multiple antennas (e.g., an array antenna) and multiple dummy cells, and the n-th antenna module 743 may include multiple antennas (e.g., an array antenna) and multiple dummy cells.

According to an embodiment, the electronic device 700 may include the communication module 710 for communicating with an external electronic device, the first antenna module 741 including multiple first antenna cells and first dummy cells surrounding the multiple first antenna cells, and the controller 720 for controlling the communication module 710 and the first antenna module 741. In this case, each of the multiple first antenna cells may be configured to have a first size, and each of the first dummy cells may be configured to have a second size smaller than the first size. According to an embodiment, the size of a cell may represent an area (or extent) of the cell or a volume of the cell.

According to an embodiment, the electronic device 700 may further include a package including the communication module 710 and the first antenna module 741.

According to an embodiment, the electronic device 700 may include the second antenna module 742 including multiple second antenna cells and second dummy cells surrounding the multiple second antenna cells. According to an embodiment, the electronic device 700 may further include a package including the communication module 710, the first antenna module 741, and the second antenna module 742.

According to an embodiment, each of the multiple first antenna cells may include a feed for receiving power.

According to an embodiment, each of the first dummy cells may be configured to have a via and to have a resonance length identical to that of the multiple first antenna cells. According to an embodiment, positions and the number of vias included in each of the first dummy cells may be determined according to a polarization direction.

According to an embodiment, it may be configured that the number of the first dummy cells is greater than that of the multiple first antenna cells and an interval between first dummy cells is smaller than that between the multiple first antenna cells. According to an embodiment, each of the first dummy cells may be configured to have a resonance length shorter than that of the multiple first antenna cells. According to an embodiment, each of the first dummy cells may be configured in at least one shape among circle, triangle, rectangle, or square. According to an embodiment, each of the first dummy cells may be configured to have a multilayer structure. According to an embodiment, each of the first dummy cells may be configured by combination of dummy cells having different sizes. According to an embodiment, the first dummy cells may be arranged in a scan direction.

According to an embodiment, the electronic device 700 may include a communication module 710 configured to perform communication with an external electronic device, the first antenna module 741 including multiple first antenna cells and first dummy cells surrounding the multiple first antenna cells, the second antenna module 742 located a preconfigured distance apart from the first antenna module 741 and including multiple second antenna cells and second dummy cells surrounding the multiple second antenna cells, and the controller 720 configured to control the communication module 710, the first antenna module 741, and the second antenna module 742.

According to an embodiment, each of the multiple first antenna cells may be configured to have a first size, and each of the first dummy cells may be configured to have a second size smaller than the first size. According to an embodiment, each of the multiple second antenna cells may be configured to have a third size, and each of the second dummy cells may be configured to have a fourth size smaller than the third size.

According to an embodiment, the first size of each of the multiple first antenna cells may be equal to the third size of each of the multiple second antenna cells. According to an embodiment, the second size of each of the first dummy cells may be equal to the fourth size of each of the second dummy cells.

Figure 8A:
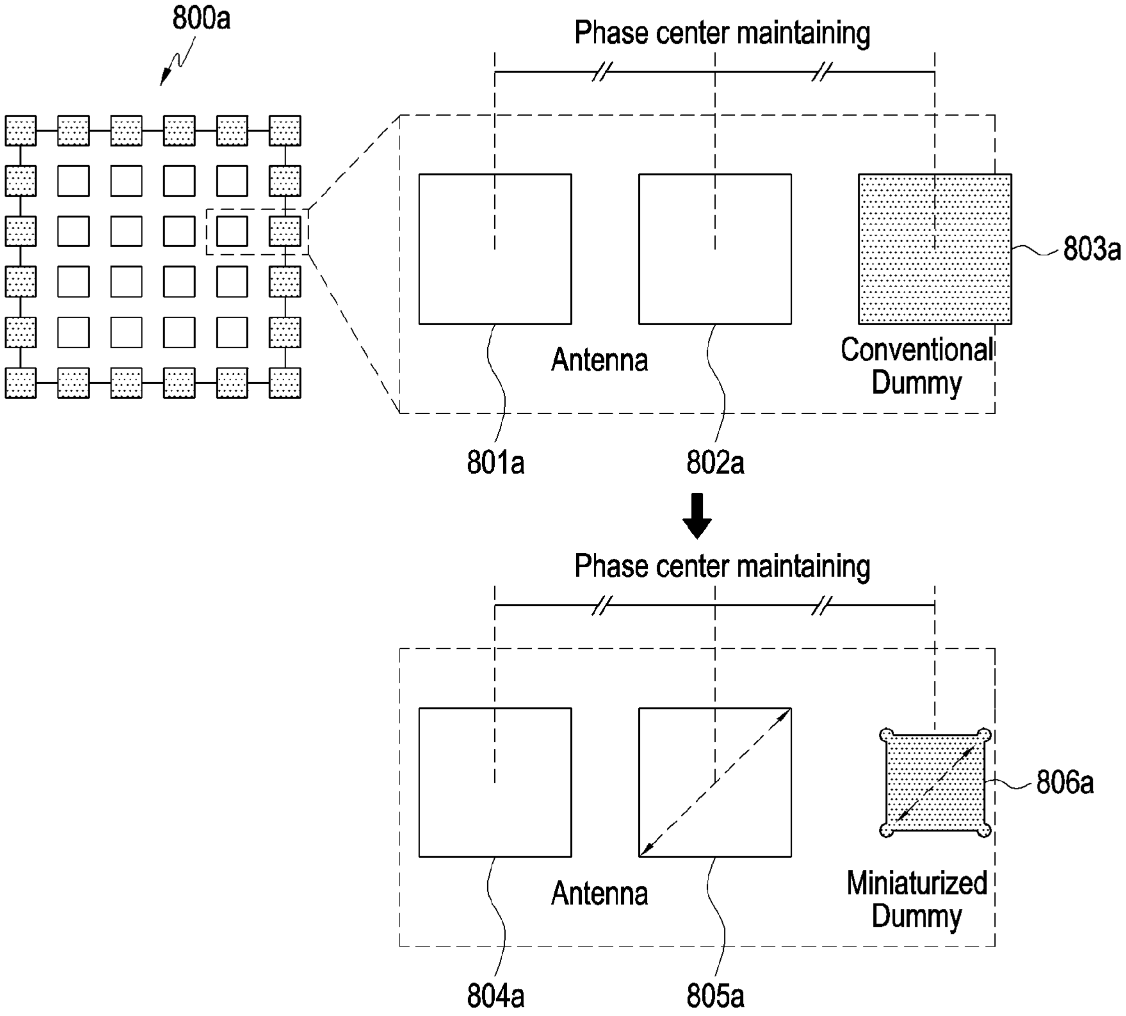
FIG. 8A is a view illustrating a process of configuring a miniaturized dummy included in an antenna module according to an embodiment of the disclosure.

FIG. 8A is a view illustrating a process of configuring a miniaturized dummy included in an antenna module according to an embodiment of the disclosure.

Referring to FIG. 8A, an antenna module 800*a* may include 4×4 antennas including 16 antenna cells (or radiation antenna elements) and dummy cells surrounding antenna cells.

According to an embodiment, a first interval between phase centers of a first antenna cell 801*a* and a second antenna cell 802*a* included in the antenna module 800*a* may be implemented to be identical to a second interval between phase centers of the second antenna cell 802*a* and a dummy cell 803*a*.

According to an embodiment, the dummy cell 803*a* may be implemented as (or replaced with) a miniaturized dummy cell 806*a* that may re-radiate at the same frequency as the antenna cell. A first interval between phase centers of a third antenna cell 804*a* and a fourth antenna cell 805*a* included in the antenna module 800*a* may be implemented to be identical to a second interval between phase centers of the fourth antenna cell 805*a* and the miniaturized dummy cell 806*a*.

According to an embodiment, the miniaturized dummy cell 806*a* may be implemented to have a resonance length identical to that of each of the third antenna cell 804*a* and the fourth antenna cell 805*a* by using a via. According to an embodiment, a size of the miniaturized dummy cell 806*a* or a height of the via may be adjusted so that the miniaturized dummy cell has the same resonance length as each of the third antenna cell 804*a* and the fourth antenna cell 805*a*. According to an embodiment, positions or the number of vias included in the miniaturized dummy cell 806*a* may be configured differently according to a polarization direction.

Figure 8B:
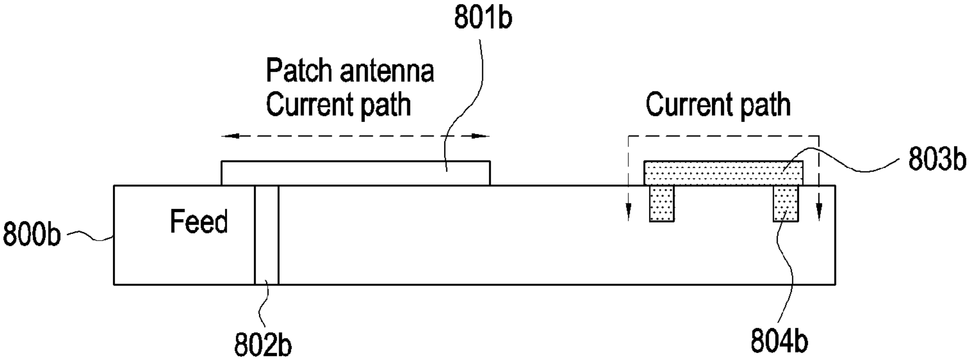
FIG. 8B is a view illustrating a structure of a miniaturized dummy according to an embodiment of the disclosure.

FIG. 8B is a view illustrating a structure of a miniaturized dummy according to an embodiment of the disclosure.

Referring to FIG. 8B, an antenna module 800*b* may include at least one antenna cell and at least one dummy cell. A resonance length may be configured according to a patch antenna current path 801*b* in the antenna cell within the antenna module 800*b* and the antenna cell may receive power from an electronic device through a feed 802*b*. A resonance length may be configured according to a current path 803*b* in the dummy cell within the antenna module 800*b*, and the current path 803*b* may be determined considering a via 804*b* included in the dummy cell.

According to an embodiment, the dummy cell includes the via 804*b* and thus may be implemented (or designed) to have a resonance length identical to that of the antenna cell. According to an embodiment, the dummy cell may be implemented (or designed) to have a resonance length identical to that of the antenna cell by adjusting a size or height of the via. According to an embodiment, positions or the number of vias included in the dummy cell may be determined according to a polarization direction.

Figure 8C:
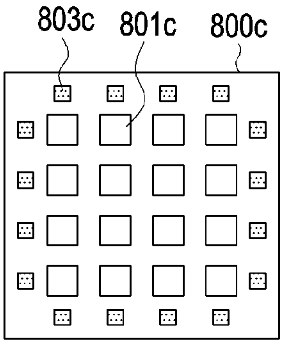
FIG. 8C is a view illustrating an example of an antenna module including a miniaturized dummy according to an embodiment of the disclosure.

FIG. 8C is a view illustrating an example of an antenna module including a miniaturized dummy according to an embodiment of the disclosure.

Referring to FIG. 8C, an antenna module 800*c* may include an antenna cell 801*c* and a miniaturized dummy cell 803*c*. According to an embodiment, the antenna module 800*c* may include 16 antenna cells including the antenna cell 801*c* and 16 dummy cells surrounding antenna cells and disposed on a periphery. According to an embodiment, the miniaturized dummy cell 803*c* may be implemented to have a size smaller (or area smaller) than that of the antenna cell 801*c*. The number of dummy cells in the antenna module (800C) is implemented to be the same as the number of antenna cells in FIG. 8C, but the disclosure is not limited thereto, and the number of the dummy cells may be variously implemented.

Figure 8D:
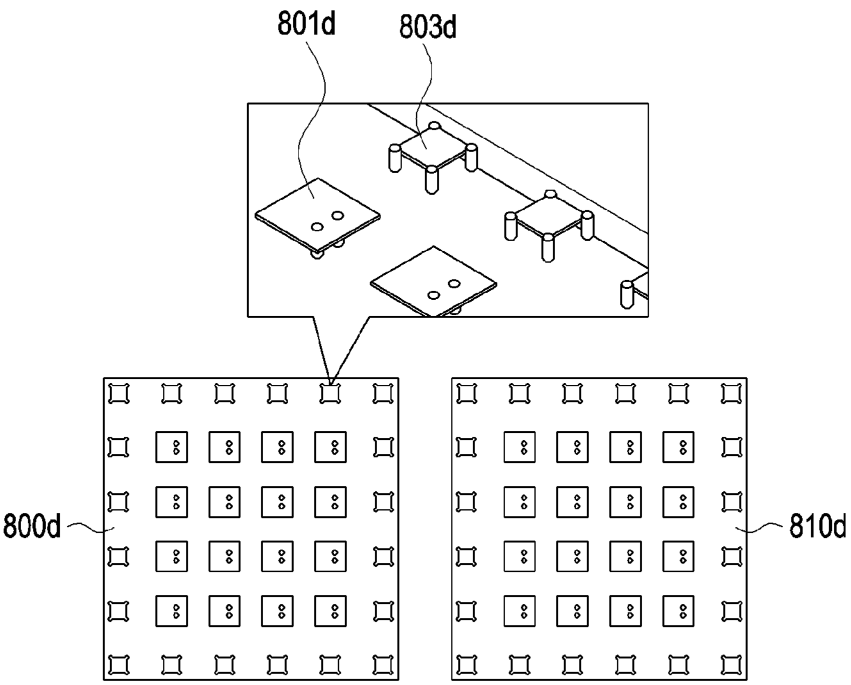
FIG. 8D is a view illustrating another example of an antenna module including a miniaturized dummy according to an embodiment of the disclosure.
Figure 8E:
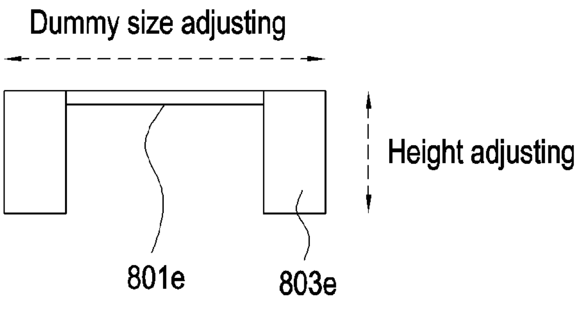
FIG. 8E is a view illustrating an example of a miniaturized dummy according to an embodiment of the disclosure.

FIG. 8D is a view illustrating another example of an antenna module including a miniaturized dummy according to an embodiment of the disclosure, and FIG. 8E is a view illustrating an example of a miniaturized dummy according to an embodiment of the disclosure.

Referring to FIG. 8D, an electronic device may include a first antenna module 800*d* and a second antenna module 810*d*. The first antenna module 800*d* may include an antenna cell 801*d* and a dummy cell 803*d*. Referring to FIGS. 8D and 8E, a size 801*e* of the dummy cell 803*d* or a height of a via 803*e* may be adjusted to have the same resonance length as that of the antenna cell 801*d*.

Figure 8F:
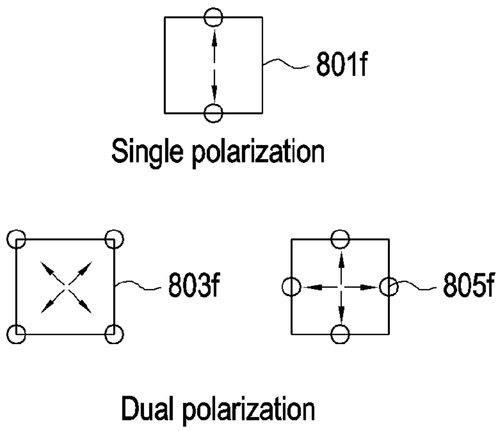
FIG. 8F is a view illustrating another example of a miniaturized dummy according to an embodiment of the disclosure.

FIG. 8F is a view illustrating another example of a miniaturized dummy according to an embodiment of the disclosure.

Referring to FIG. 8F, vias in a miniaturized dummy cell included an antenna module may be variously arranged depending on polarization. In case of single polarization, two vias may be disposed in the miniaturized dummy cell (801*f*). In case of dual polarization, four vias may be disposed at each corner of a dummy cell in the miniaturized dummy cell (803*f*). In case of dual polarization, four vias may be disposed at each side of a dummy cell in the miniaturized dummy cell (805*f*).

Figure 9A:
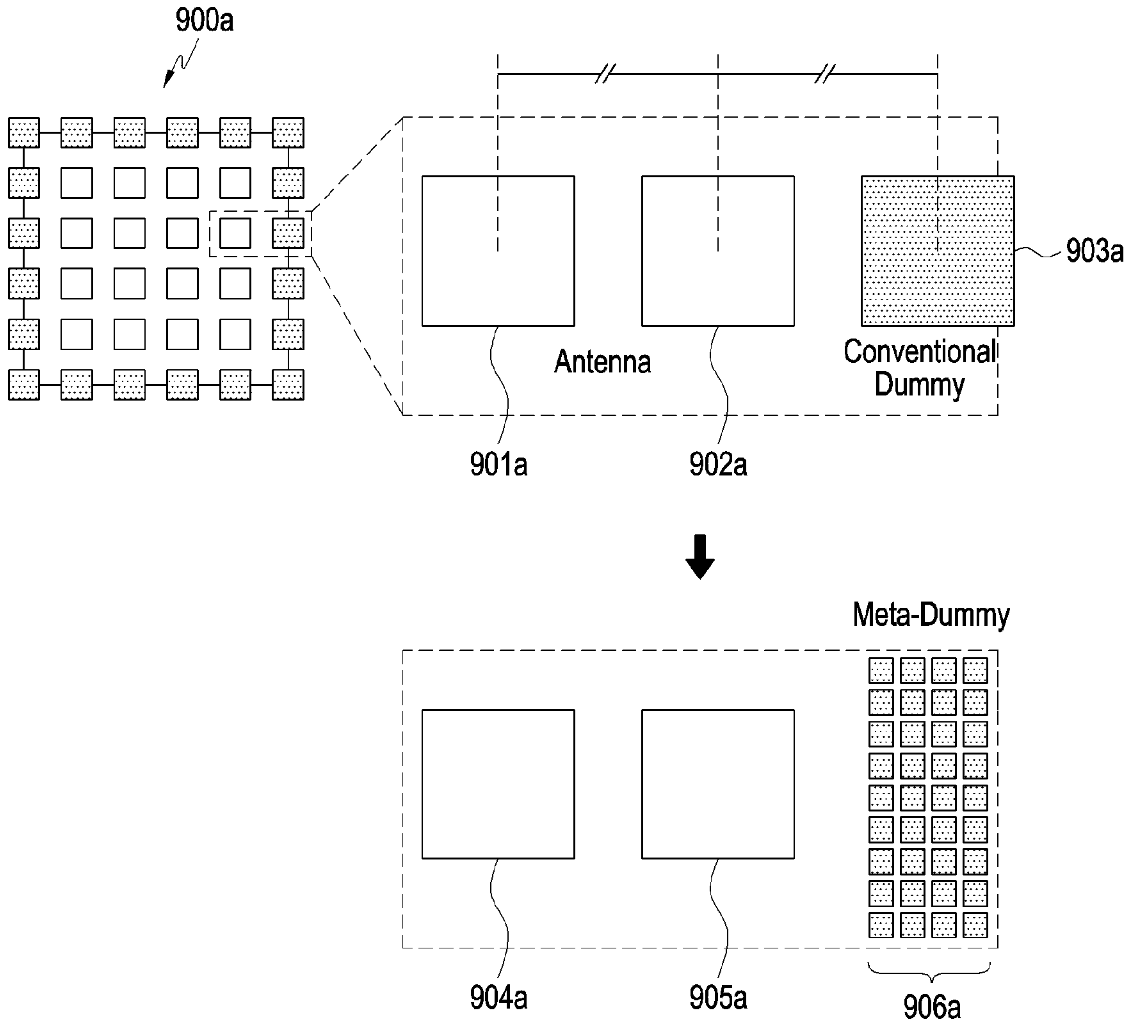
FIG. 9A is a view illustrating a process of configuring a meta dummy included in an antenna module according to an embodiment of the disclosure.

FIG. 9A is a view illustrating a process of configuring a meta dummy included in an antenna module according to an embodiment of the disclosure.

Referring to FIG. 9A, an antenna module 900*a* may include 4×4 antennas including 16 antenna cells (or radiation antenna elements) and dummy cells surrounding antenna cells.

According to an embodiment, a first interval between phase centers of a first antenna cell 901*a* and a second antenna cell 902*a* included in the antenna module 900*a* may be implemented to be identical to a second interval between phase centers of the second antenna cell 902*a* and a dummy cell 903*a*.

According to an embodiment, the dummy cell 903*a* may be implemented as (or replaced with) meta-dummy cells 906*a* that may re-radiate at the same frequency as the antenna cell. According to an embodiment, due to meta-dummies disposed adjacent to a radiating patch of the antenna cell, coupling may be increased and a wide beam pattern may be generated. According to an embodiment, meta-dummies operating at the resonant frequency of the antenna cell may be implemented based on different shapes, monolayer/multilayer structures, different sizes, different spacings, and different distances from the patch. For example, the meta dummy cells 906*a* may include 36 cells in a 4×9 format.

According to an embodiment, a first interval between phase centers of a third antenna cell 904*a* and a fourth antenna cell 905*a* included in the antenna module 900*a* may be implemented to be identical to a second interval between phase centers of the fourth antenna cell 905*a* and meta-dummy cells 906*a*. According to another embodiment, the first interval between phase centers of the third antenna cell 904*a* and the fourth antenna cell 905*a* included in the antenna module 900*a* may be implemented to be different from the second interval between phase centers of the fourth antenna cell 905*a* and the meta-dummy cells 906*a*.

Figure 9B:
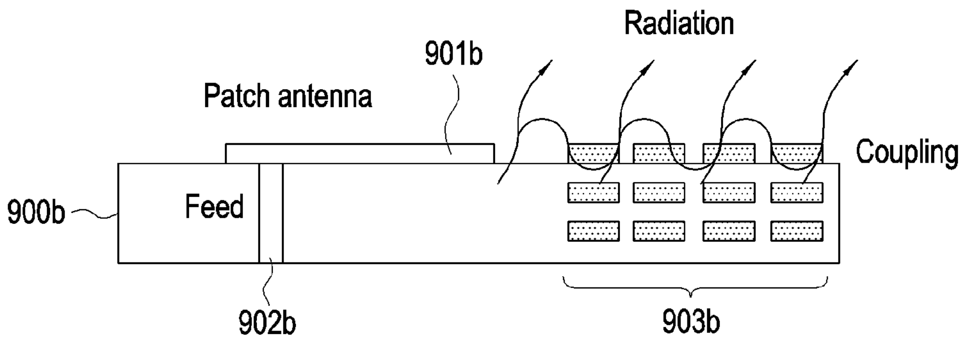
FIG. 9B is a view illustrating a structure of a meta dummy according to an embodiment of the disclosure.

FIG. 9B is a view illustrating a structure of a meta dummy according to an embodiment of the disclosure.

Referring to FIG. 9B, an antenna module 900*b* may include at least one antenna cell and at least one meta-dummy cell. A resonance length may be configured according to a patch antenna current path 901*b* in the antenna cell within the antenna module 900*b* and the antenna cell may receive power from an electronic device through a feed 902*b*. According to an embodiment, the antenna cell 901*b* may perform radiation and coupling and generate a wide bean pattern due to the meta-dummy cells 903*b* arranged adjacent.

Figure 9C:
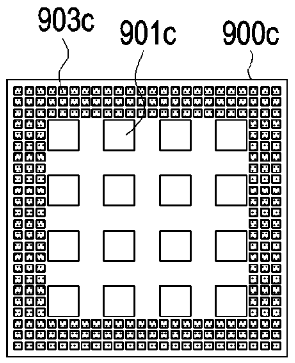
FIG. 9C is a view illustrating an example of an antenna module including a meta dummy according to an embodiment of the disclosure.

FIG. 9C is a view illustrating an example of an antenna module including a meta dummy according to an embodiment of the disclosure.

Referring to FIG. 9C, an antenna module 900*c* may include an antenna cell 901*c* and multiple meta-dummy cells 903*c*. According to an embodiment, the antenna module 800*c* may include 16 antenna cells including the antenna cell 901*c* and multiple meta-dummy cells 903*c* surrounding antenna cells and disposed on a periphery. According to an embodiment, the number of the multiple meta-dummy cells 903*c* within the antenna module 900*c* may configured to be larger than that of the antenna cells, and a first interval between the multiple meta-dummy cells 903*c* may be configured to be narrower than a second interval between the antenna cells. According to an embodiment, the number of the multiple meta-dummy cells 903*c* included in the antenna module 900*c* may be variously implemented depending on design specifications.

Figure 9D:
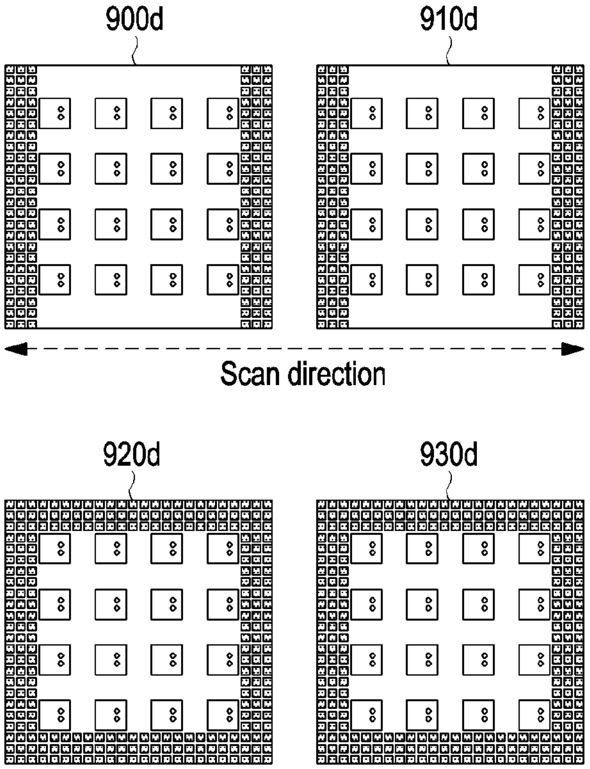
FIG. 9D is a view illustrating another example of an antenna module including a meta dummy according to an embodiment of the disclosure.

FIG. 9D is a view illustrating another example of an antenna module including a meta dummy according to an embodiment of the disclosure.

Referring to FIG. 9D, an electronic device may include a first antenna module 900*d* and a second antenna module 910*d*, and meta-dummy cells included in each of the first antenna module 900*d* and the second antenna module 910*d* may be arranged in a scan direction. According to an embodiment, the meta-dummy cells included in each of the first antenna module 900*d* and the second antenna module 910*d* are arranged in the scan direction to improve a scan range.

Referring to FIG. 9D, the electronic device may include a third antenna module 920*d* and a fourth antenna module 930*d*, and meta-dummy cells included in each of the third antenna module 920*d* and the fourth antenna module 930*d* may be arranged in a scan direction and in a perpendicular direction of the scan. According to an embodiment, the meta-dummy cells included in each of the third antenna module 920*d* and the fourth antenna module 930*d* may be arranged in the scan direction to improve a scan range. According to an embodiment, the meta-dummy cells included in each of the third antenna module 920*d* and the fourth antenna module 930*d* may be arranged in a perpendicular direction of the scan to allow symmetric beam shaping.

Figure 9E:
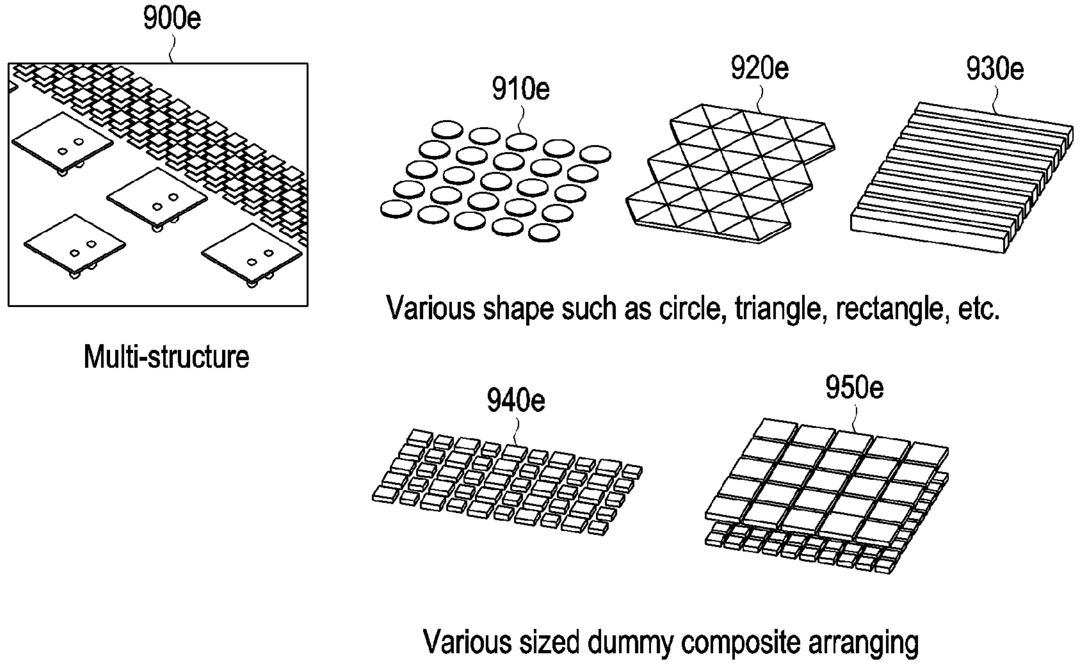
FIG. 9E is a view illustrating various examples of a meta dummy according to an embodiment of the disclosure.

FIG. 9E is a view illustrating various examples of a meta dummy according to an embodiment of the disclosure.

Referring to FIG. 9E, multiple meta dummy cells included in an antenna module may be implemented as a multilayer structure 900*e*, a circular shape 910*e*, a triangular shape 920*e*, or a rectangular shape 930*e*. According to an embodiment, the multiple meta-dummy cells included in the antenna module may be arranged as a composite of meta-dummy cells of various sizes 940*e* or 950*e*.

Figure 10:
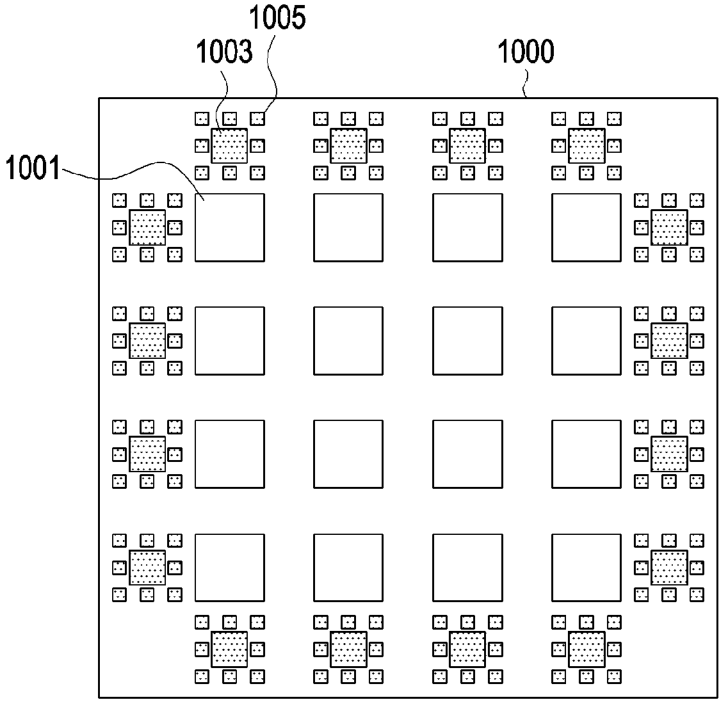
FIG. 10 is a view illustrating an example of an antenna module including a miniaturized dummy and a meta dummy according to an embodiment of the disclosure.

FIG. 10 is a view illustrating an example of an antenna module including a miniaturized dummy and a meta dummy according to an embodiment of the disclosure.

Referring to FIG. 10, the antenna module 1000 may include multiple antenna cells (e.g., 1001), multiple miniaturized dummy cells (e.g., 1003), and multiple meta-dummy cells (e.g., 1005). According to an embodiment, the antenna module 1000 may include antenna cells including an antenna cell 1001, first dummy cells (or miniaturized dummy cells) disposed to surround the antenna cells and including a miniaturized dummy cell 1003, and second dummy cells (or meta-dummy cells) disposed to surround the first dummy cells and including a meta-dummy cell 1005.

According to an embodiment, the miniaturized dummy cell 1003 may be implemented to have a smaller size (or smaller area) than the antenna cell 1001, and the meta-dummy cell 1005 may be implemented to have a smaller size (or smaller area) than the miniaturized dummy cell 1003.

According to an embodiment, it may be configured that in the antenna module 1000, the number of the second dummy cells (or meta-dummy cells) is greater than that of the first dummy cells (or miniaturized dummy cells), and a first interval between the second dummy cells is narrower than a second interval between the first dummy cells.

In FIG. 10, the number of each of the antenna cells, first dummy cells (or miniaturized dummy cells), and second dummy cells (or meta-dummy cells) in the antenna module 1000 is shown as an example for convenience of explanation, but the technical idea of the disclosure is not thereto, and the number of antenna cells, first dummy cells, and second dummy cells may each be implemented in various ways depending on design specifications.

Figure 11:
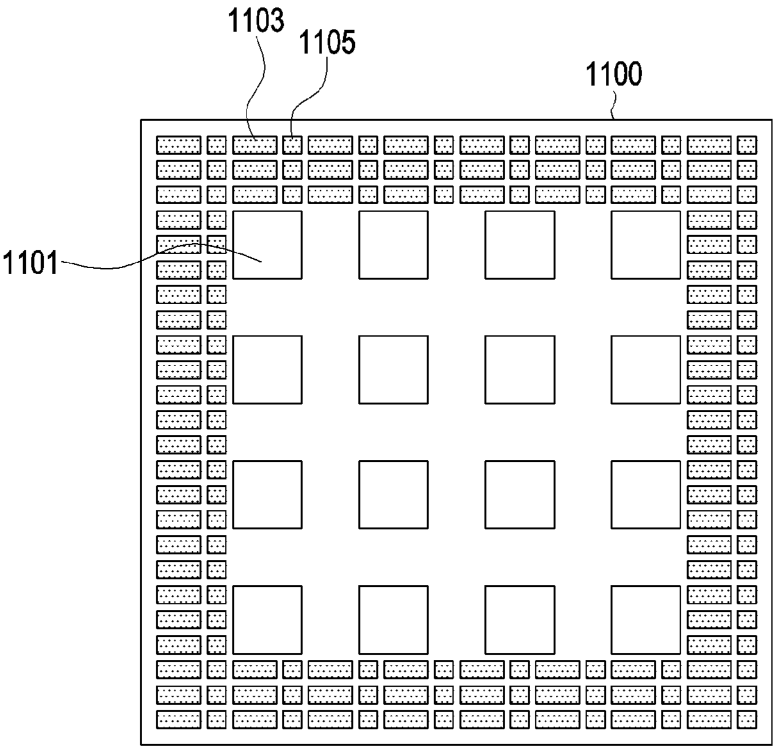
FIG. 11 is a view illustrating an example of an antenna module including meta dummies having various sizes according to an embodiment of the disclosure.

FIG. 11 is a view illustrating an example of an antenna module including meta dummies having various sizes according to an embodiment of the disclosure.

Referring to FIG. 11, the antenna module 1100 may include multiple antenna cells (e.g., 1101), first meta-dummy cells (e.g., 1103) having a first size, and second meta-dummy cells (e.g., 1105) having a second size. According to an embodiment, the antenna module 1100 may include antenna cells including an antenna cell 1101, first meta-dummy cells disposed to surround the antenna cells and including a first meta-dummy cell 1103, and second meta-dummy cells disposed to surround the antenna cells and including a second meta-dummy cell 1105.

According to an embodiment, the first meta-dummy cell 1103 may be implemented to have a larger size (or larger area) than that of the second meta-dummy cell 1105. According to an embodiment, each of the first meta-dummy cells and the second meta-dummy cells may be alternately disposed in the antenna module 1100.

In FIG. 11, the number of each of the antenna cells, first meta-dummy cells, and second meta-dummy cells in the antenna module 1100 is shown as an example for convenience of explanation, but the technical idea of the disclosure is not thereto, and the number of antenna cells, first meta-dummy cells, and second meta-dummy cells may each be implemented in various ways depending on design specifications.

Figure 12:
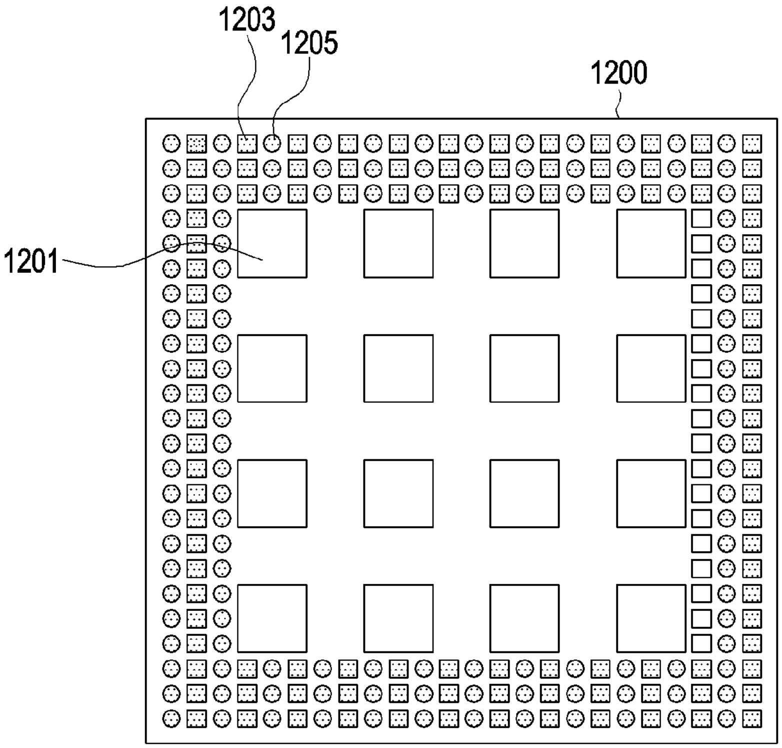
FIG. 12 is a view illustrating an example of an antenna module including meta dummies having various shapes according to an embodiment of the disclosure.

FIG. 12 is a view illustrating an example of an antenna module including meta dummies having various shapes according to an embodiment of the disclosure.

Referring to FIG. 12, the antenna module 1200 may include multiple antenna cells (e.g., 1201), rectangular first meta-dummy cells (e.g., 1203), and circular second meta dummy cells (e.g., 1205). According to an embodiment, the antenna module 1200 may include antenna cells including an antenna cell 1201, first meta-dummy cells disposed to surround the antenna cells and including a rectangular first meta-dummy cell 1203, and circular second meta-dummy cells disposed to surround the antenna cells.

According to an embodiment, each of the first meta-dummy cells and the second meta-dummy cells may be alternately disposed in the antenna module 1200. According to an embodiment, in the antenna module 1200, the first meta-dummy cells may be implemented in shapes other than the square, and the second meta-dummy cells may be implemented in shapes other the circle.

In FIG. 12, the number of each of the antenna cells, first meta-dummy cells, and second meta-dummy cells in the antenna module 1200 is shown as an example for convenience of explanation, but the technical idea of the disclosure is not thereto, and the number of antenna cells, first meta-dummy cells, and second meta-dummy cells may each be implemented in various ways depending on design specifications.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising an antenna module, the electronic device comprising:

a communication module configured to communicate with an external electronic device;

a first antenna module comprising multiple first antenna cells and first dummy cells configured to surround the multiple first antenna cells and re-radiate at a same frequency as the multiple first antenna cells; and a controller configured to control the communication module and the first antenna module, wherein each of the multiple first antenna cells is configured to have a first size, and each of the first dummy cells is configured to have a second size smaller than the first size.

2. The electronic device of claim 1, further comprising a package comprising the communication module and the first antenna module.

3. The electronic device of claim 1, further comprising:

a second antenna module comprising multiple second antenna cells and second dummy cells configured to surround the multiple second antenna cells; and a package comprising the communication module, the first antenna module, and the second antenna module.

4. The electronic device of claim 1, wherein each of the multiple first antenna cells comprises a feed configured to receive power.

5. The electronic device of claim 1, wherein each of the first dummy cells comprises one or more vias and each of the first dummy cells is configured to have a resonance length identical to that of the multiple first antenna cells.

6. The electronic device of claim 5, wherein positions and a number of the one or more vias included in each of the first dummy cells are determined according to a polarization direction.

7. The electronic device of claim 1, wherein a number of the first dummy cells is greater than that of the multiple first antenna cells, and an interval between the first dummy cells is smaller than that between the multiple first antenna cells.

8. The electronic device of claim 7, wherein each of the first dummy cells is configured to have a resonance length shorter than that of the multiple first antenna cells.

9. The electronic device of claim 7, wherein each of the first dummy cells is configured in at least one shape among circle, triangle, rectangle, or square.

10. The electronic device of claim 7, wherein each of the first dummy cells is configured to have a multi-layer structure.

11. The electronic device of claim 7, wherein each of the first dummy cells comprises a combination of dummy cells having different sizes.

12. The electronic device of claim 7, wherein the first dummy cells are arranged in a scan direction.

13. An electronic device comprising an antenna module, the electronic device comprising:

a communication module configured to communicate with an external electronic device;

a first antenna module comprising multiple first antenna cells and first dummy cells configured to surround the multiple first antenna cells and re-radiate at a same frequency as the multiple first antenna cells;

a second antenna module disposed spaced a preconfigured distance apart from the first antenna module and comprising multiple second antenna cells and second dummy cells configured to surround the multiple second antenna cells; and a controller configured to control the communication module, the first antenna module, and the second antenna module, wherein each of the multiple first antenna cells is configured to have a first size, and each of the first dummy cells is configured to have a second size smaller than the first size, and each of the multiple second antenna cells is configured to have a third size, and each of the second dummy cells is configured to have a fourth size smaller than the third size.

14. The electronic device of claim 13, wherein the first size is identical to the third size, and the second size is identical to the fourth size.

15. The electronic device of claim 13, further comprising a package comprising the communication module, the first antenna module, and the second antenna module.

* * * * *